US008781174B2

(12) United States Patent
Tseng et al.

(10) Patent No.: US 8,781,174 B2
(45) Date of Patent: Jul. 15, 2014

(54) METHOD AND SYSTEM FOR RECOGNIZING PLANT DISEASES AND RECORDING MEDIUM

(75) Inventors: Shin-Mu Tseng, Tainan (TW);
Ja-Hwung Su, Kaohsiung County (TW);
Wei-Yi Chang, Taoyuan County (TW);
Yung-Hsing Peng, Kaohsiung (TW);
Wei-Chung Chen, New Taipei (TW)

(73) Assignee: Institute for Information Industry, Taipei (TW)

( * ) Notice: Subject to any disclaimer, the term of this patent is extended or adjusted under 35 U.S.C. 154(b) by 125 days.

(21) Appl. No.: 13/540,845

(22) Filed: Jul. 3, 2012

(65) Prior Publication Data

US 2013/0136312 A1 May 30, 2013

(30) Foreign Application Priority Data

Nov. 24, 2011 (TW) .............................. 100143140 A

(51) Int. Cl.
*G06K 9/00* (2006.01)
(52) U.S. Cl.
USPC ......................................... 382/110; 348/135
(58) Field of Classification Search
USPC ......... 382/100, 110, 162, 164, 165, 181, 190, 382/195; 348/135
See application file for complete search history.

(56) References Cited

U.S. PATENT DOCUMENTS

| 4,296,405 A * | 10/1981 | Rich .............................. 382/110 |
| 5,253,302 A * | 10/1993 | Massen .......................... 382/110 |
| 5,841,883 A * | 11/1998 | Kono et al. ................... 382/110 |
| 6,014,451 A * | 1/2000 | Berry et al. ................... 382/110 |
| 6,212,824 B1 * | 4/2001 | Orr et al. ................... 47/58.1 R |
| 8,086,046 B2 * | 12/2011 | Fujita ............................. 382/224 |
| 8,553,929 B2 * | 10/2013 | Motoyama ..................... 382/100 |
| 2008/0075348 A1 * | 3/2008 | Rappaport et al. ............ 382/132 |

FOREIGN PATENT DOCUMENTS

| JP | 08-116790 A | 5/1996 |
| JP | 08-266153 A | 10/1996 |
| JP | 10-323127 A | 12/1998 |

OTHER PUBLICATIONS

Katsunori Goto, et al., "Diagnostic Approach to Groth of Paddy Rice Using Digital Camera Image Analysis", Tohoku Agric. Res., 2004, pp. 59-60, vol. 57.

* cited by examiner

*Primary Examiner* — Anand Bhatnagar
(74) *Attorney, Agent, or Firm* — Muncy, Geissler, Olds & Lowe, P.C.

(57) ABSTRACT

A method and a system for recognizing plant diseases and a recording medium are provided. The method includes: providing a plant disease database, for storing plant disease and disease characteristic image corresponding to the plant disease; after obtaining plant image by an image capture device, obtaining segmented plant image by an image processing unit according to a first processing technique, and obtaining suspected region image according to a second processing technique; calculating an area of the suspected region image, and when the area is greater than a preset area, using the suspected region image as syndrome image, and comparing the syndrome image with the disease characteristic image; and when the syndrome image matches any specific disease characteristic image, obtaining a corresponding specific plant disease.

20 Claims, 10 Drawing Sheets

METHOD AND SYSTEM FOR RECOGNIZING PLANT DISEASES AND RECORDING MEDIUM

CROSS-REFERENCE TO RELATED APPLICATION

This application claims the benefit of Taiwan Patent Application No. 100143140, filed on Nov. 24, 2011, which is hereby incorporated by reference for all purposes as if fully set forth herein.

BACKGROUND OF THE INVENTION

1. Field of Invention

The present invention relates to a method and a system for recognizing plant diseases and a recording medium thereof, and more particularly to a method and a system for rapidly analyzing plant disease symptoms in order to recognize plant diseases by using an image and tone analyzing technology, and a recording medium thereof.

2. Related Art

The conventional plant diseases detection mainly uses breath sensing method (for example, laser-based photoacoustic sensing); however, it is required to sense the gas emitted by plants in an enclosed environments. In addition, the relevance between the emitted gas and plant diseases may need to have a further study, and the cost of hardware implementation of the technology is very high.

According to another conventional method, after taking photo images from a plant, an image analysis technology is used on the images to identify whether the plant has suffered for plant diseases and whether the plant leaves reveals symptoms. Taking the orchid industry as an example, according to a conventional method, image analysis and identification method is performed on an orchid image to separate an orchid leaves image from the orchid image, where it is required to use features of color and texture with a neural network analysis method to correctly find and analysis the orchid leaves image from the image, so as to identify whether the orchid has suffered plant diseases and whether the leaves have revealed symptoms. However, the method is too complex, because it is required to collect a large number of image data and to perform data training before separating the orchid leaves image from the orchid image. Therefore, the method is unable to meet the practical application requirements because of its low efficiency, incapability of displaying the result immediately, and the variations of leaves images.

In the above conventional method, leaves image is separated and analyzed to find plant disease symptoms, and the plant disease symptoms are identified to determine whether the leaves have suffered plant diseases. However, the method still has the following problems to be solved.

(1) In the conventional method, the leaves image and petals image are extracted from the image by their specific colors and textures, such that the calculation is complex in the method. In addition, much calculation time, low efficiency and unable to display the result immediately are also the problems appeared in the method.

(2) The image variations of the leaves and the petals are considerably high due to various factors such as growth conditions and shooting angles; therefore, it is required to collect a large number of leaves and petals images for data training, and get features for color, shape and texture in advance. Therefore, the method has the problems of time consuming, high cost, and low accuracy.

(3) The image analysis and determination are time consuming; therefore, the method cannot be applied to plant fields (for example, flower fields and orchid farms) or sorting system for plants or relative automatic equipment.

It can be known that, the conventional method for identifying whether a plant has suffered from diseases by using the image identification method needs to be improved.

SUMMARY OF THE INVENTION

The present invention is directed to a method and a system for recognizing plant diseases and a recording medium thereof, which can rapidly search an image of a specific part of a plant and identify whether the image has a suspected diseased region and a symptom region by utilizing the feature that the plant has specific tones, and compare the suspected diseased region and the symptom region with a plant disease database to judge whether a disease occurs on the current specific part of the plant, so as to further determine the disease.

The present invention provides a method for recognizing plant diseases, which includes the following steps. First, a plant disease database is provided, which is used for storing at least one plant disease and at least one piece of disease characteristic image corresponding to each plant disease. A piece of plant image is obtained by an image capture device, the plant image is analyzed by an image processing unit according to a first processing technique to obtain a piece of segmented plant image, and the segmented plant image is analyzed according to a second processing technique to obtain at least one suspected region image. The area of each piece of suspected region image is calculated, and when the area of the suspected region is greater than a preset threshold, the suspected region image is taken as a piece of syndrome image. Finally, the syndrome image is compared with at least one piece of disease characteristic image in the plant disease database, and when the syndrome image matches a piece of specific disease characteristic image in the at least one piece of disease characteristic image, a specific plant disease corresponding to the specific disease characteristic image is reported.

The present invention provides a system for recognizing plant diseases, which includes a plant disease database, an image capture unit, and an image processing unit. The plant disease database stores at least one plant disease and a disease characteristic image corresponding to each plant disease. The image capture unit obtains a piece of plant image. The image processing unit analyzes the plant image according to a first processing technique to obtain a piece of segmented plant image, analyzes the segmented plant image information according to a second processing technique to obtain at least one suspected region image, calculates the area of each piece of suspected region image, and when the area of the suspected region is greater than a preset threshold, takes the suspected region image as a piece of syndrome image, and compares the syndrome image with at least one piece of disease characteristic image in the plant disease database, and when the syndrome image matches a piece of specific disease characteristic image in the at least one piece of disease characteristic image, reports the specific plant disease corresponding to the specific disease characteristic image.

In the system and the method mentioned above, further, the step that image processing unit analyzes the plant image to obtain the segmented plant image according to the first technique comprises, first, splitting the plant image into a piece of foreground image and a piece of background image according to a brightness analysis technique, and then analyzes the foreground image to obtain the segmented plant image according to a hue transform technique, wherein the brightness analysis technique, according to the plant image, obtains a red-green-blue (RGB) data of the plant image, transforms the plant image into a grey-scale plant image according to the data of the plant image, and performs a binarization according to the grey-scale plant image to obtain the foreground image and the background image of the plant image.

In the system and method mentioned above, further, after the image processing unit obtains the segmented plant image, the image processing unit further filter noises in the segmented plant image first, and analyzes the filtered image according to a hue transform technique to obtain the at least one piece of suspected region image.

In the system and method mentioned above, further, the system for recognizing plant diseases further includes a connected component algorithm, for calculating multiple connected regions of the segmented plant image, and removing regions whose areas are smaller than a threshold.

In the system and method mentioned above, further, the first processing technique and the second processing technique can adopt the same or different hue transform techniques.

In the system and method mentioned above, further, the second processing technique determines at least one range of disease hue, and takes those parts of the segmented plant image that matches whose hues fall within at least one range of disease hue as at least one piece of suspected region image.

The present invention further provides a recording medium, for storing an electronic device readable program code to execute a method for recognizing plant diseases, wherein steps of the method are as described above, and details will not be repeated herein.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the aforementioned and other objectives and advantages of the present invention comprehensible, embodiments accompanied with figures are described in detail below.

Figure 1:
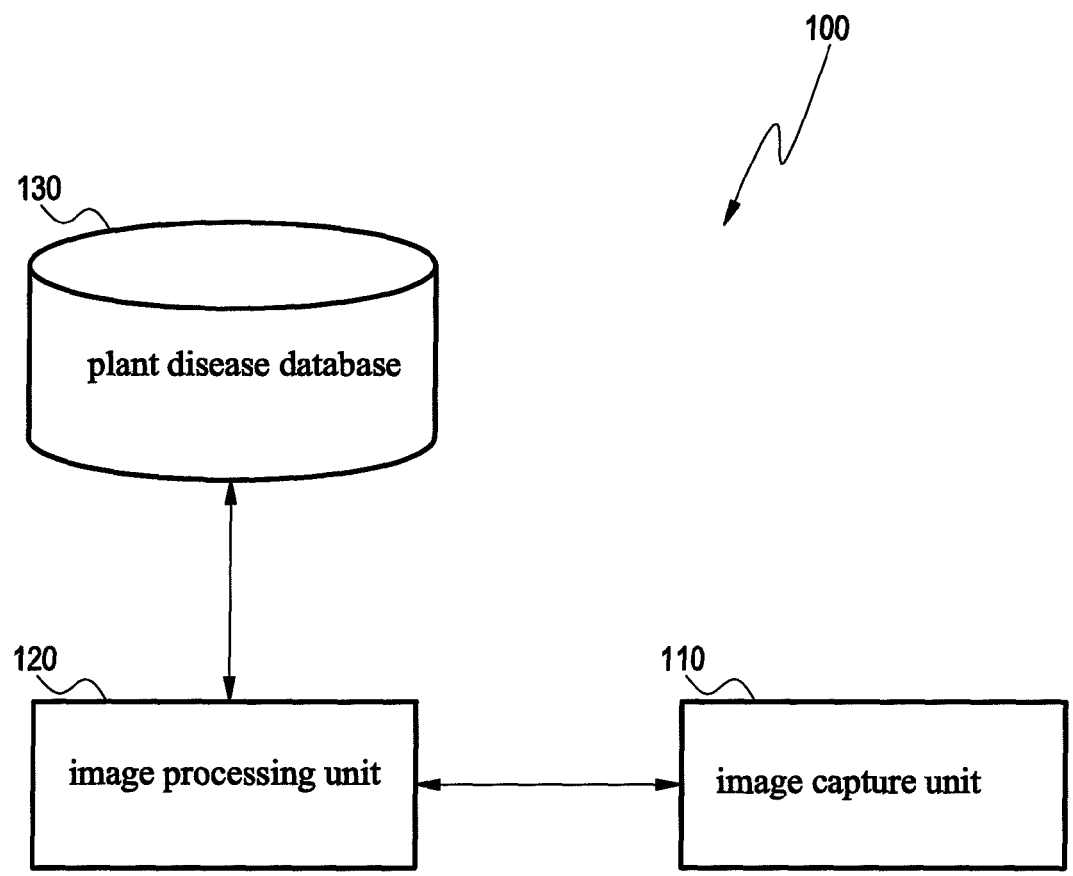
FIG. 1 is a perspective block diagram of system elements according to an embodiment of the present invention.

FIG. 1 is a perspective block diagram of system elements according to an embodiment of the present invention. The system 100 for recognizing plant diseases includes an image capture unit 110, an image processing unit 120, and a plant disease database 130. The plant disease database 130 stores at least one plant disease and a disease characteristics corresponding to each plant disease. The image capture unit 110 obtains a piece of plant image. The image processing unit 120 analyzes the obtained plant image according to a first processing technique to obtain a piece of segmented plant image (for example, an image of one or more leaves or petals), analyzes the obtained segmented plant image (for example, leaves or petals) according to a second processing technique, and takes out a suspected region image when the segmented plant image has a suspected diseased region (for example, a region of which the color is significantly different from the leave color/petal color, which may be a symptom). Next, the image processing unit 120 may calculate a area of each piece of suspected region image, and take the suspected region image as a piece of syndrome image when the area of the suspected diseased region is greater than a preset area. The value of the preset area may be determined according to a conventional technology or general empirical values, or may be determined according to the disease characteristics in the plant disease database 130. When the area of the suspected diseased region is not greater than the preset area, the suspected diseased region is considered as a noise in the image. Then, the image processing unit 120 may compare the syndrome image with the disease characteristic image in the plant disease database 130, and when the syndrome image match a piece of specific disease characteristic image in the plant disease database 130, obtain a specific plant disease corresponding to the matched specific disease characteristic image as a disease recognition result.

Figure 2:
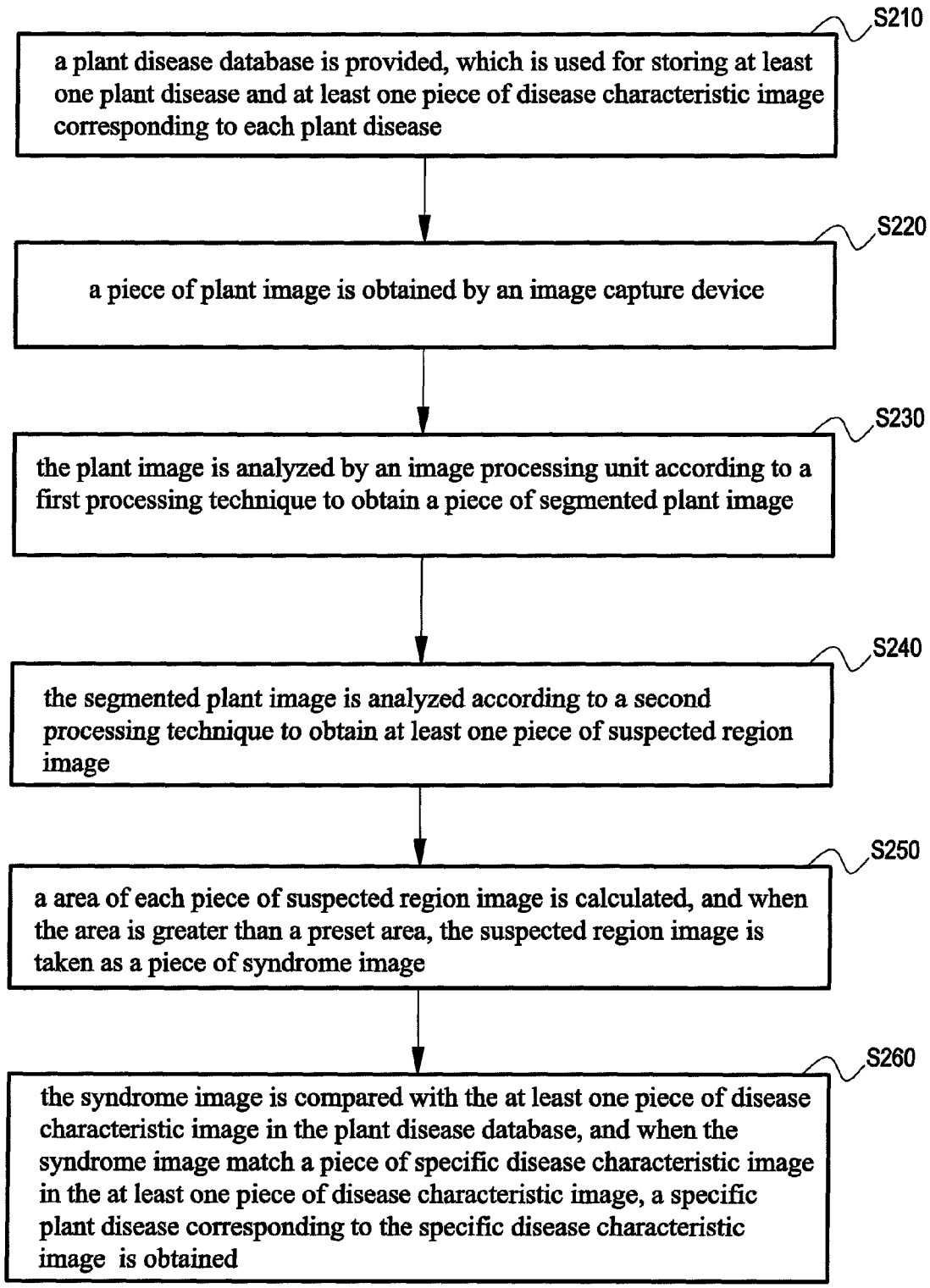
FIG. 2 is a flow chart of steps of an embodiment of the present invention.

FIG. 2 is a flow chart of steps of an embodiment of the present invention, which can be implemented through the system in FIG. 1. The main steps are as follows.

In Step S210, a plant disease database is provided, which is used for storing at least one plant disease and at least one piece of disease characteristic image corresponding to each plant disease.

In this embodiment, the plant disease database may be a commercially available database, a database established according to the conventional technology, or a database established through the technologies in the following FIG. 5 and FIG. 6.

In Step S220, a piece of plant image is obtained by an image capture device.

In Step S230, the plant image is analyzed by an image processing unit according to a first processing technique to obtain a piece of segmented plant image.

In Step S230, the first processing technique is mainly used to transform a red-green-blue (RGB) data value of the plant image into tones, define a range of hues to be taken out in advance, and then take out a part of the plant image whose tones fall within the range of hues as the segmented plant image. As the plant image (for example, the leaves and the petals) generally has a specific color, and after the specific color is transformed into hues, the hues are concentrated in a specific range. The present invention utilizes this feature to take out the plant image. In this way, data training is not needed, and the plant image can be segmented without comparing the color, the shape, and the texture in the planting image, thereby significantly improving the speed of segmenting the plant image.

The hue refers to the definition that is commonly used by persons of ordinary in the art, for example, a YUV hue value.

It is obtained by transforming an RGB value into a YUV hue value (brightness, chromaticity, and concentration) through a formula that is developed and used by persons of ordinary skill in the art. In the present invention, a conversion formula between the hue values and the RGB values can be defined by users according to features of a plant, for example, brightness, chromaticity, concentration, grey scale, hue difference, brightness, and contrast. In addition, a hue value may have more than one dimension. Generally speaking, the higher the dimension is, the higher the accuracy is, and the longer the time for conversion is. On the contrary, the lower the dimension is, the lower the accuracy is, and the shorter the time for conversion is. In some embodiments, the hue dimension is preferably 2-3 dimensions.

Further, in order to avoid that the background colors are similar to the plant colors in the plant image, the step that the image processing unit analyzes the plant image according to the first hue technology to obtain the segmented plant image may include, first, splitting the plant image into a piece of foreground image and a piece of background image according to a brightness analysis technique, and then analyzing the foreground image according to the hue transform technique to obtain the segmented plant image. The brightness analysis technique is used for obtaining an RGB data corresponding to the plant image according to the plant image, transforming the plant image into a grey-scale plant image according to the RGB data of the plant image, and performing binarization according to the grey-scale plant image to obtain the foreground image and the background image of the plant image.

In the foregoing embodiment, the binary image processing method may be used to separate the plant foreground image and the plant background image. The binary image processing method is also called as a grey division (threshold) image processing method, which mainly includes, setting a grey value, and setting an image that has a grey greater than the set grey value as a bright point, and setting an image that has a grey smaller than the set grey value as a dark point, thereby obtaining a binary image.

In Step S240, the segmented plant image is analyzed according to a second processing technique to obtain at least one piece of suspected region image.

In this step, the second processing technique is used for defining at least one range of disease hue, and taking out a part of the segmented plant image that match at least one range of disease hue as at least one piece of suspected region image. The principle of the second processing technique is the same as that described in the first processing technique, and the disease image in the plant image may always have a specific range of hues or a significant difference from the range of hues, so the present invention utilizes the feature to search for the suspected diseased region in the plant image. The second processing technique may define more than one range of disease hue, and then take out an image that match the disease range of hues from the segmented plant image as the suspected region image. The suspected region image may be one or more. Different diseases may have the same or different disease range of hues, and the second processing technique may search for an image that match the specific disease range of hues for the specific disease range of hues. In another embodiment, the second processing technique may also use all the ranges of hue other than the range of hues as the disease range of hues.

In this embodiment, the first processing technique and the second processing technique in Step S230 and Step S240 are the same or different processing technologies. When the first processing technique and the second processing technique are the same processing technique, the range of hues and the plurality of disease ranges of hue may be defined respectively.

In another embodiment, after the image processing unit obtains the segmented plant image, the image processing unit is used for removing noises in the segmented plant image first, and then analyzing the segmented plant image with the noises removed according to the second processing technique to obtain the suspected region image. The removing the noises in the segmented plant image may include, calculating a plurality of connected regions of the segmented plant image by using a connected component algorithm, and considering blocks with an area smaller than a threshold as noises and removing the noises. The concept of the connected component algorithm refers to that if continuous image points exist between two points in the image, the points are considered as connected to each other, and on the contrary, if no continuous image points exist between the two points, the points are considered as disconnected. By means of the connected graph, potential blocks may be found by the continuous points in the plant image, and the area of the blocks may be calculated, where the blocks with an excessively small area are noises.

In Step S250, a area of each piece of suspected region image is calculated, and when the area is greater than a preset area, the suspected region image is taken as a piece of syndrome image.

In Step S260, the syndrome image is compared with the at least one piece of disease characteristic image in the plant disease database, and when the syndrome image match a piece of specific disease characteristic image in the at least one piece of disease characteristic image, a specific plant disease corresponding to the specific disease characteristic image is obtained.

In this embodiment, due to the features that the parts of the plant generally have the same hue, the plant and a region that is suspected to be diseased can be rapidly recognized from the image by utilizing the difference in hue. When a certain partial region in the parts of the plant has abnormal changes, the hue also has significant changes, so that the abnormal region can be rapidly found as the suspected diseased region by using the technology of the present invention when the suspected diseased region is found and is confirmed as the symptom region, the syndrome image is compared with the disease data in the plant disease database, thereby achieving the purpose of rapidly determining the plant disease.

In this embodiment, the segmented plant image, the at least one suspected region image, the syndrome image, and the at least one piece of disease characteristic image are image hue data that have been processed by hue technologies.

Figure 3:
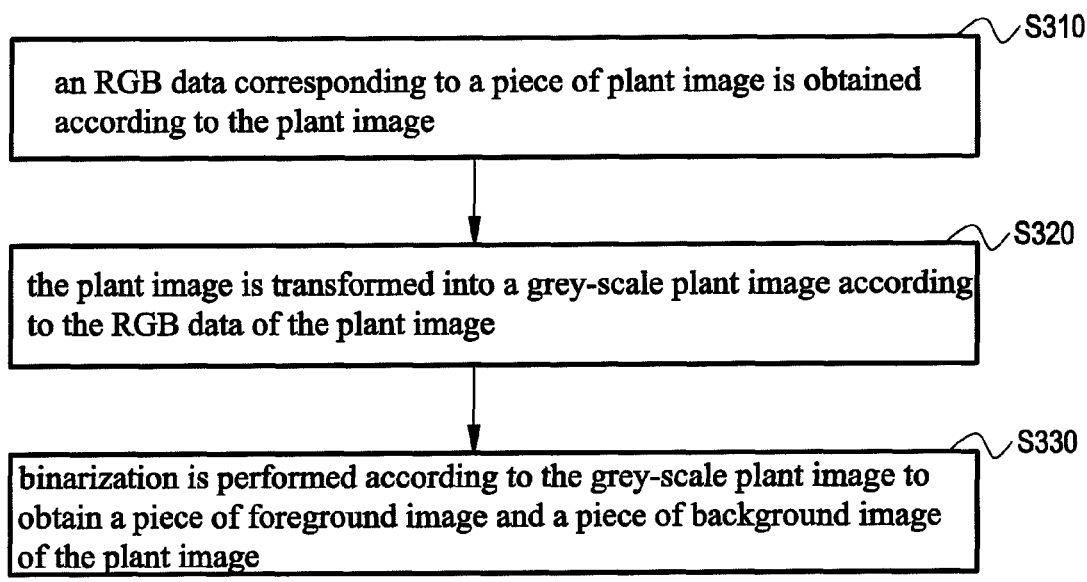
FIG. 3 is a flow chart of implementation steps of the brightness analysis technique.

FIG. 3 is a flow chart of implementation steps of the brightness analysis technique. Referring to FIG. 3, main steps are as follows.

In Step S310, an RGB data corresponding to a piece of plant image is obtained according to the plant image.

In Step S320, the plant image is transformed into a grey-scale plant image according to the RGB data of the plant image.

In Step S330, binarization is performed according to the grey-scale plant image to obtain a piece of foreground image n and a piece of background image of the plant image i.

Figure 4A:
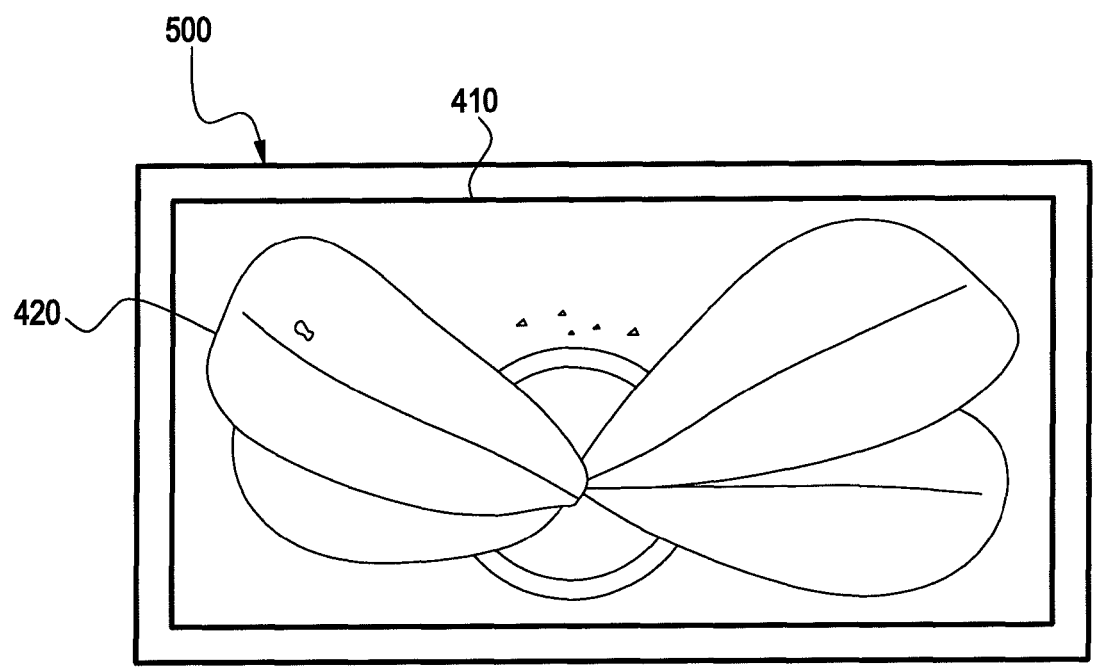
FIG. 4A is a perspective view of capturing a plant image.
Figure 4B:
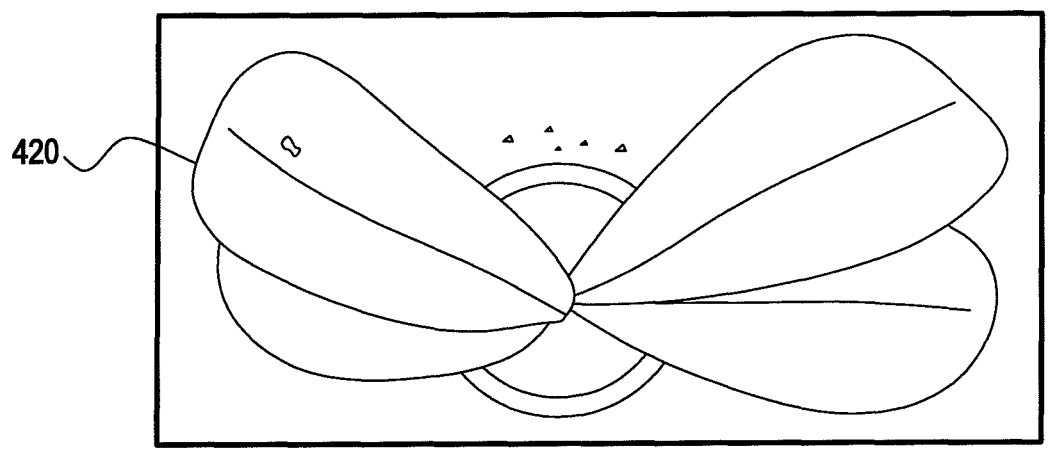
FIG. 4B is a perspective view of a foreground image of the plant image in FIG. 4A.
Figure 4C:
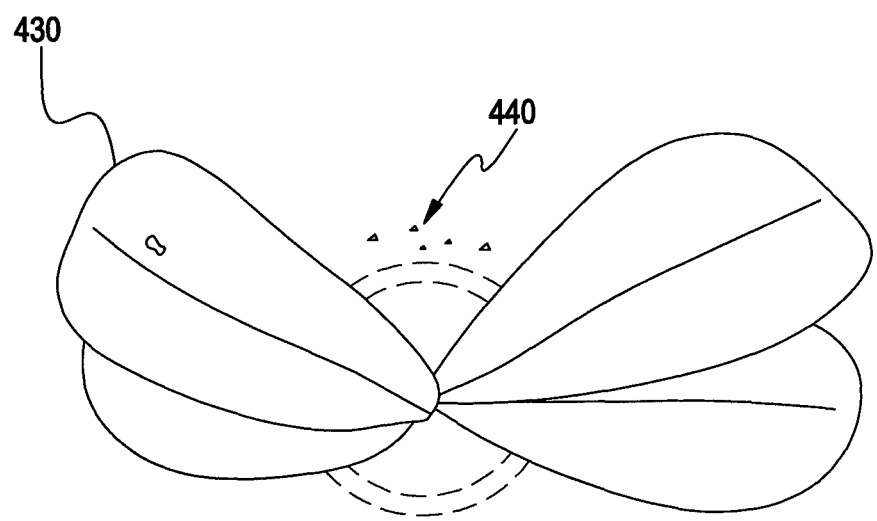
FIG. 4C is a perspective view of a plant image of the foreground image in FIG. 4B.
Figure 4D:
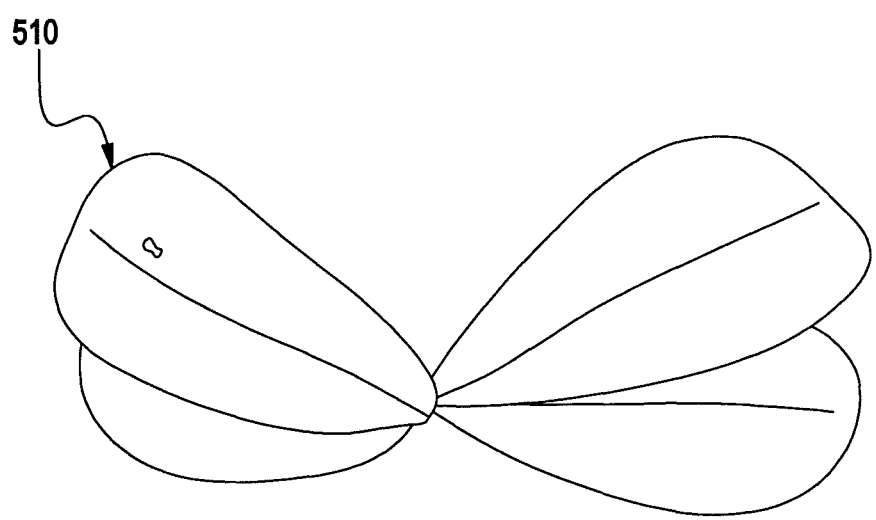
FIG. 4D is a perspective view of a plant image profile range of the plant image in FIG. 4C.
Figure 4E:
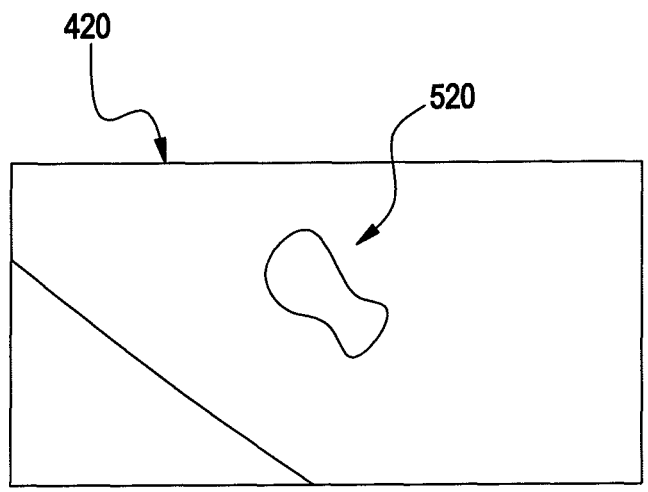
FIG. 4E is a perspective view of a plant image profile range having a suspected diseased region in FIG. 4D.
Figure 4F:
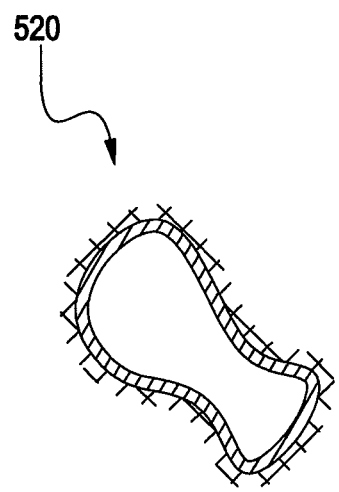
FIG. 4F is a perspective view of the suspected diseased region of the plant in FIG. 4D.

Then, referring to FIG. 4A to FIG. 4F. FIG. 4A is a perspective view of capturing a plant image. FIG. 4B is a perspective view of a foreground image of the plant image in FIG. 4A. FIG. 4C is a perspective view of a plant image of the foreground image in FIG. 4B. FIG. 4D is a perspective view of a plant image profile range of the plant image in FIG. 4C. FIG. 4E is a perspective view of a plant image profile range having a suspected diseased region in FIG. 4D. FIG. 4F is a perspective view of the suspected diseased region of the plant in FIG. 4D.

In another embodiment, when the image capture unit 110 obtains the plant image 500, the image processing unit 120 may first obtain the RGB data corresponding to the plant image 500 from the plant image 500 according to the brightness analysis technique, transform the plant image 500 into a grey-scale plant image according to the RGB data, and then perform binarization according to the grey-scale plant image to obtain a piece of background image 410 and a piece of foreground image 420 of the plant image 500 (as shown in FIG. 4B).

Generally speaking, the plant is always planted in a pot, in order to accurately take out the image of the plant, the image processing unit 120 further separate the plant part and the pot part in the foreground image 420 as shown in FIG. 4B, and analyzes a piece of segmented plant image 430 (as shown in FIG. 4C). At this time, if the plant part has some image noise 440, the image processing unit 120 may also take the blocks with a small area as noises and remove the noises by means of the connected component algorithm, so as to obtain the plant image profile information 510 with the noises removed (as shown in FIG. 4D).

Next, it is determined whether the plant image profile information 510 with the noises removed has a suspected diseased region by utilizing the second processing technique, and when it is determined that a suspected region image 520 (as shown in FIG. 4E) exists, it is determined whether the area of the suspected region image 520 is greater than a preset area (as shown in FIG. 4F). If the suspected region image 520 is greater than the preset area, the suspected region image 520 is considered as a piece of syndrome image, and is compared with a disease symptom image information in the plant disease database 130, if a specific disease symptom image information that match the suspected region image 520 exists, a specific plant disease corresponding to the specific disease symptom image information in the plant disease database 130 is obtained.

Figure 5:
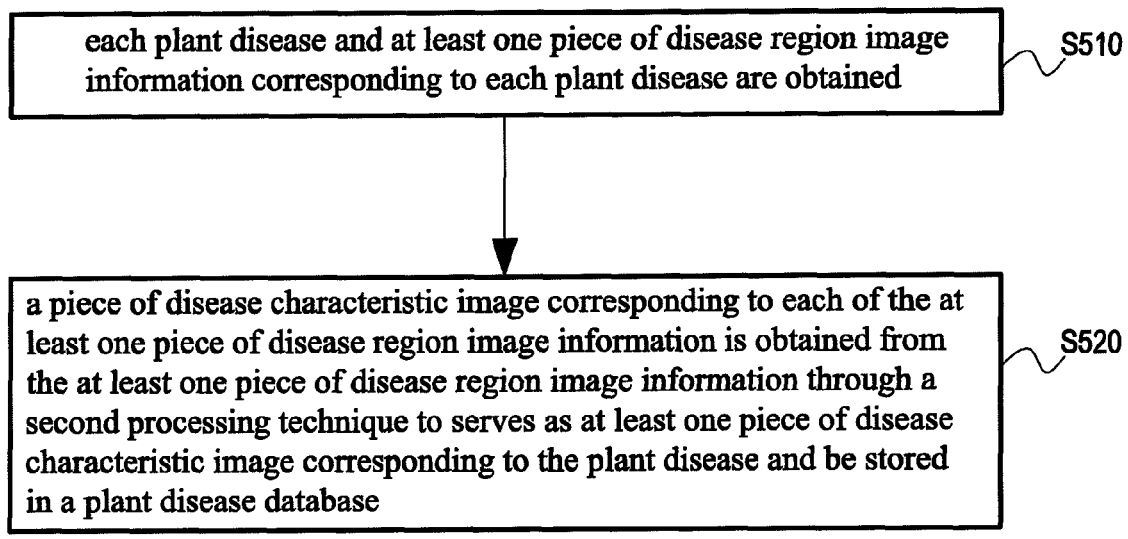
FIG. 5 is a flow chart of steps for establishing a symptom database.
Figure 6:
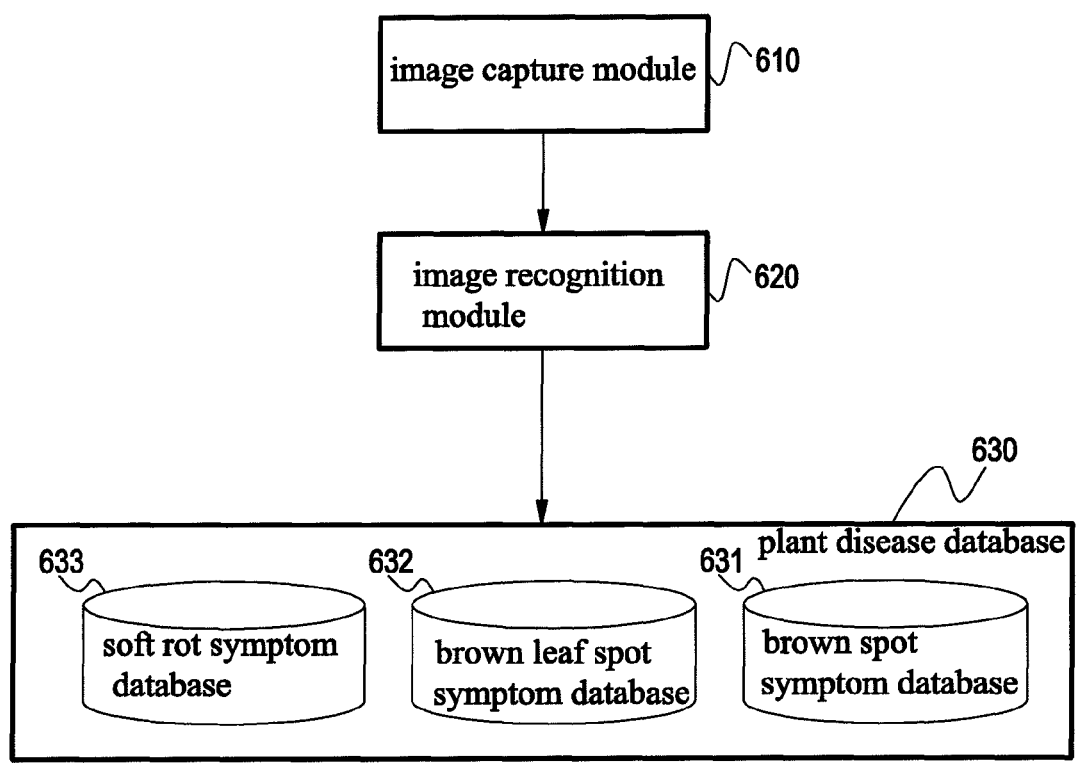
FIG. 6 is a system block diagram of the symptom database in FIG. 5.

Next, referring to FIG. 5 to FIG. 6 together, FIG. 5 is a flow chart of steps for establishing a symptom database. FIG. 6 is a system block diagram of the symptom database in FIG. 5. In FIG. 5, the steps for establishing a symptom database are as follows.

In Step S510, each plant disease and at least one piece of disease region image information corresponding to each plant disease are obtained.

In Step S520, a piece of disease characteristic image corresponding to each of the at least one piece of disease region image information is obtained from the at least one piece of disease region image information through a second processing technique to serves as at least one piece of disease characteristic image corresponding to the plant disease and be stored in a plant disease database.

For example, a plurality of plant disease region images are obtained by using an image capture module 610, and a piece of disease characteristic image corresponding to each of the at least one piece of disease region image information is obtained through a image recognition module 620, where relevant plant disease database such as a brown spot symptom database 631, a brown leaf spot symptom database 632 and a soft rot symptom database 633 in the plant disease database 630 respectively stores disease region image information corresponding to various specific diseases.

Finally, the plant symptom image corresponding to the at least one plant disease is stored in the plant disease database according to the comparison result, so that more potential symptoms of the same plant symptom can be obtained.

In view of the above, the present invention has the advantages of high recognition rate, high performance efficiency, low computational complexity, and low cost, and can achieve the efficacy of rapid recognition in plant disease recognition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for recognizing plant diseases, comprising:
providing a plant disease database, for storing at least one plant disease and at least one piece of disease characteristic image corresponding to each plant disease;
obtaining a piece of plant image by an image capture device;
analyzing the plant image to obtain a piece of segmented plant image by an image processing unit according to a first processing technique, and analyzing the segmented plant image information according to a second processing technique to obtain at least one suspected region image;
calculating the area of each suspected region image, and when the area is greater than a preset threshold, taking the suspected region image as a piece of syndrome image; and
comparing the syndrome image with at least one piece of disease characteristic image in the plant disease database, and when the syndrome image matches a piece of specific disease characteristic image in the at least one piece of disease characteristic images, reporting a specific plant disease corresponding to the specific disease characteristic image.

2. The method for recognizing plant diseases according to claim 1, wherein the step of analyzing the plant image to obtain the segmented plant image by the image processing unit according to the first processing technique comprises, first, splitting the plant image into a piece of foreground image and a piece of background image according to a brightness analysis technique, and analyzing foreground image to obtain the segmented plant image according to a hue transform technique.

3. The method for recognizing plant diseases according to claim 2, wherein the brightness analysis technique, according to the plant image, obtains a red-green-blue (RGB) data of the plant image; according to the data of the plant image, transforms the plant image into a grey-scale plant image; and according to the grey-scale plant image, performs a binarization to obtain the foreground image and the background image of the plant image.

4. The method for recognizing plant diseases according to claim 1, wherein after the image processing unit obtains the segmented plant image, the image processing unit further filter noises in the segmented plant image first, and analyzes the filtered image according to a hue transform technique to obtain the at least one piece of suspected region image.

5. The method for recognizing plant diseases according to claim 1, wherein the step of filtering the noises in the segmented plant image comprises, finding multiple connected regions of the segmented plant image by using a connected component algorithm, and removing regions whose area are smaller than a threshold.

6. The method for recognizing plant diseases according to claim 1, wherein the first processing technique and the second processing technique can adopt the same or different hue transform techniques.

7. The method for recognizing plant diseases according to claim 1, wherein the first processing technique transforms a red-green-blue (RGB) data of the plant image into hues, defining a range of hues, and then takes those parts of the plant image who hues fall within the defined range as the segmented plant image.

8. The method for recognizing plant diseases according to claim 7, wherein the segmented plant image, the at least one suspected region image, the syndrome image, and the at least one piece of disease characteristic image are image hue data.

9. The method for recognizing plant diseases according to claim 1, wherein the second processing technique determines at least one range of disease hue, and then takes those parts of the segmented plant image match whose hues fall within at least one range of disease hue as the at least one piece of suspected region image.

10. The method for recognizing plant diseases according to claim 1, wherein the plant disease database is established through the following steps, and the steps comprise:
  obtaining each plant disease and at least one piece of diseased region image corresponding to each plant disease; and
  obtaining disease characteristic images corresponding to the at least one piece of diseased region image from the at least one piece of diseased region image through the hue transform technique, taking the disease characteristic image as the at least one piece of disease characteristic image corresponding to the plant disease, and storing the disease characteristic image in the plant disease database.

11. A system for recognizing plant diseases, comprising:
  a plant disease database, for storing at least one plant disease and a disease characteristic image corresponding to each plant disease;
  an image capture unit, for obtaining a piece of plant image; and
  an image processing unit, for analyzing the plant image according to a first processing technique to obtain a piece of segmented plant image, and for analyzing the segmented plant image information according to a second processing technique to obtain at least one suspected region image, calculating the area of each piece of suspected image, when the area of the suspected region is greater than a preset threshold, taking the suspected region image as a piece of syndrome image, and comparing the syndrome image with at least one piece of disease characteristic image in the plant disease database, and when the syndrome image match matches a piece of specific disease characteristic image in the at least one piece of disease characteristic images, reporting the specific plant disease corresponding to the specific disease characteristic image.

12. The system for recognizing plant diseases according to claim 11, wherein the step that the image processing unit analyzes the plant image according to the first processing technique to obtain the segmented plant image comprises, first, splitting the plant image into a piece of foreground image and a piece of background image according to a brightness analysis technique, and then, analyzing the foreground image according to a hue transform technique to obtain the segmented plant image.

13. The system for recognizing plant diseases according to claim 12, wherein the brightness analysis technique obtain a red-green-blue (RGB) data of the plant image according to the plant image, transforming the plant image into a greyscale plant image according to the RGB data of the plant image; and performing the binarization according to the greyscale plant image to obtain the foreground image and the background image of the plant image.

14. The system for recognizing plant diseases according to claim 11, wherein after the image processing unit obtains the segmented plant image, the image processing unit further filter noises in the segmented plant image first, and according to a hue transform technique, analyzes the filtered image to obtain the at least one piece of suspected region image.

15. The system for recognizing plant diseases according to claim 11, wherein the system for recognizing plant diseases further comprises a connected component algorithm for calculating multiple connected regions of the segmented plant image, and removing regions whose area are smaller than a threshold.

16. The system for recognizing plant diseases according to claim 11, wherein the first processing technique and the second processing technique can adopt the same or different hue transform techniques.

17. The system for recognizing plant diseases according to claim 11, wherein the first processing technique transforms a red-green-blue (RGB) data of the plant image into hues, and defining a range of hues, and takes those parts of the plant image match whose hues fall within the defined range as the segmented plant image.

18. The system for recognizing plant diseases according to claim 17, wherein the segmented plant image, the at least one suspected region image, the syndrome image, and the at least one piece of disease characteristic image are hue data.

19. The system for recognizing plant diseases according to claim 11, wherein the second processing technique determines at least one range of disease hue, and then takes those parts of the segmented plant image match whose hues fall within at least one range of disease hue as the at least one suspected region image.

20. A non-transitory recording medium, for storing an electronic device readable program code to execute a method for recognizing plant diseases, wherein the method for recognizing plant disease comprises:
  providing a plant disease database, for storing at least one plant disease and at least one piece of disease characteristic image corresponding to each plant disease;
  obtaining a piece of plant image by an image capture device;
  analyzing the plant image to obtain a piece of segmented plant image by an image processing unit according to a first processing technique, and analyzing the segmented plant image according to a second processing technique to obtain at least one suspected region image;
  calculating the area of each piece of suspected region image, and when the area is greater than a preset threshold, taking the suspected region image as a piece of syndrome image; and
  comparing the syndrome image with at least one piece of disease characteristic image in the plant disease database, and when the syndrome image matches a piece of specific disease characteristic image in the at least one piece of disease characteristic image, obtaining a specific plant disease corresponding to the specific disease characteristic image.

* * * * *